May 25, 1926.
F. E. FUGE
1,586,192
MOTOR DRIVEN VEHICLE BRAKE
Filed June 5, 1923    2 Sheets-Sheet 2
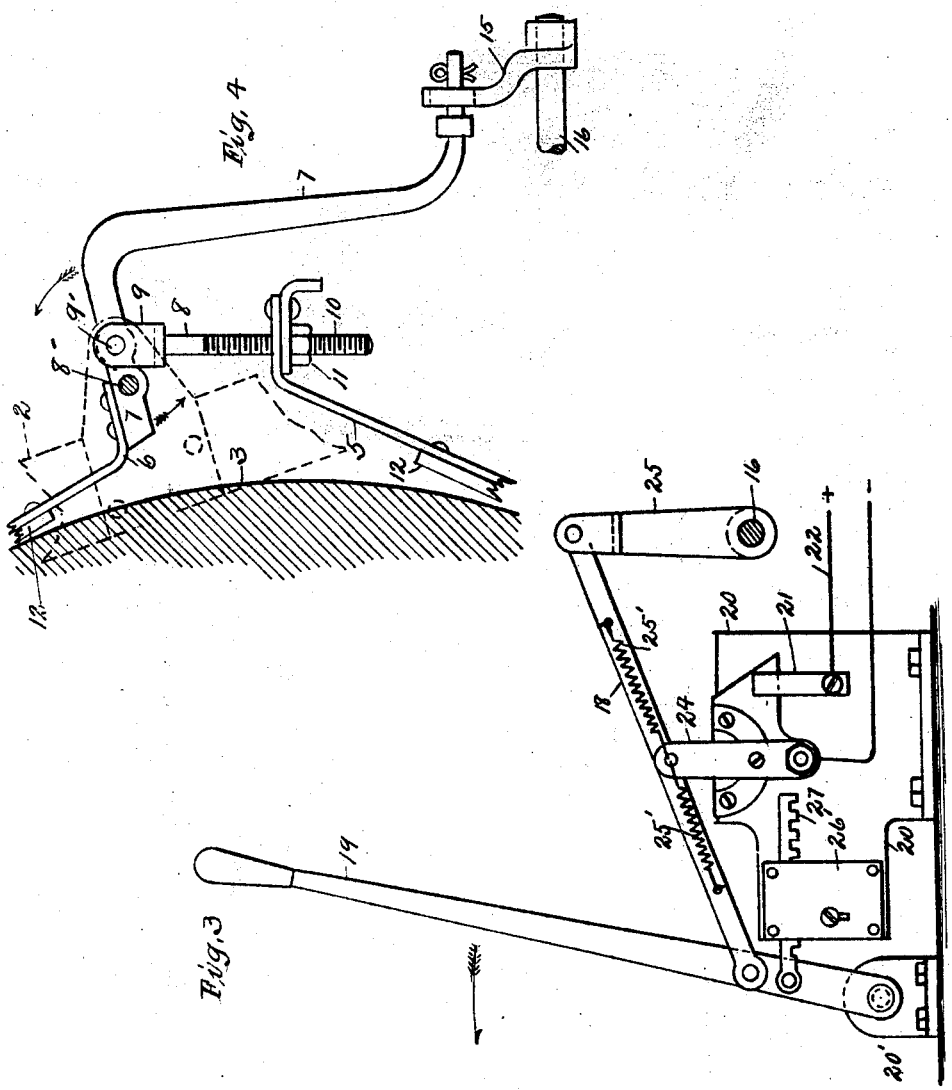

Patented May 25, 1926.

1,586,192

UNITED STATES PATENT OFFICE.

FRANK E. FUGE, OF ARNOLD, PENNSYLVANIA, ASSIGNOR OF ONE-HALF TO ARCHIE ROBERTS AND DICK CADWALLADER, BOTH OF BARKING, PENNSYLVANIA.

MOTOR-DRIVEN-VEHICLE BRAKE.

Application filed June 5, 1923. Serial No. 643,575.

This invention relates to an improved emergency brake for motor-driven vehicles and it comprises a means whereby the operator may, by a shift of the lever, apply the brake, cut off the fuel supply, break the ignition circuit, and lock parts connected to and operated by said motor, as will be fully described hereinafter.

This invention is more particularly adapted for vehicles driven by internal explosion engines, but, by slight alterations in the details of construction, may be used in connection with other power-driven vehicles, such as aeroplanes.

One of the principal objects of the present invention is to add largely to the braking power. This is accomplished by operating the brake shoes directly upon the outside perimeter of the fly wheel, it having the greatest diameter of any of the parts directly connected to, and operated by the motive power, thereby giving an actual braking surface largely in excess of any brake now in general use.

Another object of the invention, in connection with braking on the fly wheel, is the fact that by locking or retarding said wheel all the moving parts operated by the engine will be locked or retarded and the strain due to the momentum of the car will be distributed evenly among all of such parts.

A further object of the invention is to make and break the ignition circuit by the same movement of the lever that applies the brakes, thus eliminating the spark necessary to explode the fuel delivered to the engine.

A still further object of the invention is to provide a means (comprising a lock), connected with the operating lever, whereby the same may be locked, in its altered positions and remain locked until released by a key carried by the operator, thereby locking all the essential parts of the car or other vehicle to which this invention is provided.

With these and other objects in view the invention consists in the certain details of construction and combination of parts as will be fully described hereinafter.

In the accompanying drawings:—

Fig. 3 is an enlarged detail view, partly in section, of the braking apparatus.

Fig. 4 is a side elevation of the make and break switch operated in connection with the ignition circuit, together with its connected operating lever and lock for the same.

Figure 1:
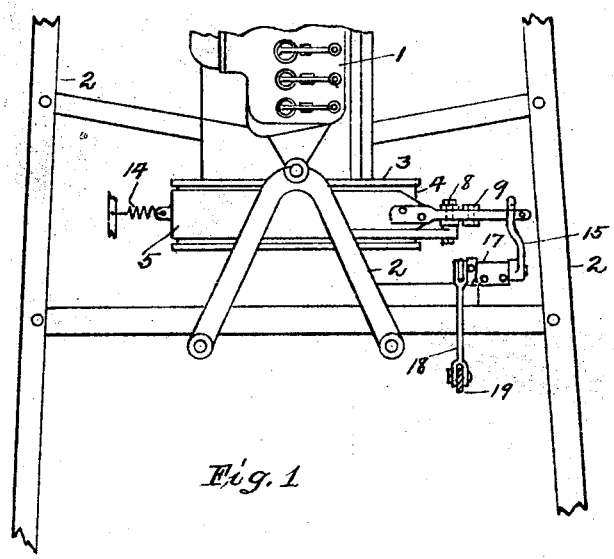
Figure 1 is a plan view of the frame, of a portion of a motor-driven vehicle, such as are now in common use, in which is shown the location of my improved braking apparatus.
Figure 2:
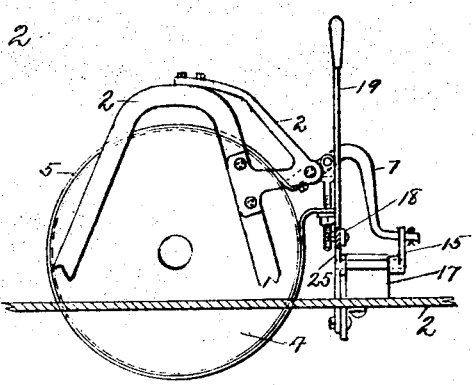
Fig. 2 is an end elevation of the same.

To put my invention in practical form with an automobile such as is now in universal use, having an engine or motor (1) rigidly attached to the frame (2), of the car, and said engine (1), having a fly wheel (3), of ordinary construction, I first form about the perimeter of the same a shallow groove (4), extending almost across the entire face of said wheel. This groove (4), is fitted with an open end brake band (5), the one end (6), of which is attached to a pivoted lever (7), at one side of said pivot (8'), and the other end of said band attached to the same lever at the opposite side of the pivot by means of a connecting link (8). This link comprises a bifurcated portion (9), attached to the lever (7), by a pin (9'), and a downwardly extending threaded shank (10), fitted with a nut (11), by means of which adjustment may be made to bring, and keep said brake band in its normal position. This band, together with its internally attached brake shoes (12), when not in use, is held free of the fly wheel by means of a spring (14). Attached to the downward extension of the lever (7) by means of an open end crank (15), carried on one end of a properly journaled shaft (16), supported in bearings (17), and the other end of said shaft connected by means of a link (18) and second crank (25), to an operating lever (19), said lever being fulcrumed at a convenient point (20') near floor of the car.

By means of this lever (19), the operator may, by a backward movement of the same, set the brake shoes tightly about the perimeter of the fly wheel, thereby retarding the engine and all of its connected parts, which includes the driving wheels of the car.

To provide a means for making or breaking the ignition circuit of the ignition, a switch is arranged adjacent to the operating lever (19). This switch comprises a plate or support (20), having a tongue (21), leading, by a proper conductor (22), to one pole of a battery, and a return conductor (23), joining the ignition and a pivoted spring-actuated lever (24), journaled to said support. This lever (24), is insulated from its support, and the free end connected by spiral springs (25'), as a flexible connection, to the link (18). This lever (24), is fitted with an extension piece (26'), which, when the lever (19), is in a forward position will contact with the tongue (21), and when the operating lever (19) is moved backward, the contact is broken, thereby eliminating any spark to the cylinders of the engine. It will be observed that this movement of the operating lever is the same previously described when setting the brake shoes, the two operations being accomplished simultaneously and in unison.

Attached to the support (20), or at any point convenient to the throw of the operating lever (19), is a key lock (26), which may be of any of the well known varieties, either of the self-locking or key operated types. A ratchet bar (27), is pivoted to the operating lever (19), and passes through said lock to form a keeper.

It will be observed that a single movement of the operating lever (19), in either direction, will operate three different mechanisms, viz, set or release the brake; make or break the ignition circuit and lock the operating lever (19).

It has been found in actual practice that when the operating lever is used to set the brake, the car will come to a quick, steady stop, due to the fly wheel transmitting its retarded motion to all of the moving operative parts, including the vehicle wheels, thereby eliminating the abrupt, jerking motion of the ordinary emergency brake now in use.

This brake and its connected parts is not designed to take the place of the emergency or ordinary brake now in use in all motor cars, but is for use in case of an emergency wherein time is the essential feature, and as one short movement of the operating lever will apply the brakes and cut out the ignition, the operation of the car is halted immediately.

Various alterations in the details of construction may be made to adapt the invention to the several makes of auto cars, or the make and break circuit may be used in connection with the brakes in present use without departing from the spirit of the invention.

Having thus described my invention, I claim:—

The combination comprising a vehicle, an internal combustion engine for operating said vehicle, a brake wheel driven by said engine, brake shoes operating on said wheel, an operating lever connected with said shoes, an ignition circuit having a make and break switch connected to and operated in unison with the operating lever.

In testimony whereof, I have hereunto signed my name.

FRANK E. FUGE.